May 27, 1969 TSUNEO TAKEZAKI ET AL 3,447,087

AUTOTUNING RADIO RECEIVER WITH FREQUENCY HOLDING CIRCUIT

Filed June 2, 1966

TSUNEO TAKEZAKI,
EKIJE KURODA, AND
KIYOTAKE FUKUI
INVENTORS

BY Wenderoth, Lind & Ponack
ATTORNEYS

INVENTORS
TSUNEO TAKEZAKI
EKIJI KURODA
KIYOTAKE FUKUI

BY Wenderoth, Lind & Ponack
ATTORNEYS 3,447,087

AUTOTUNING RADIO RECEIVER WITH FREQUENCY HOLDING CIRCUIT

Tsuneo Takezaki, Neyagawa-shi, Ekiji Kuroda, Moriguchi-shi, and Kiyotake Fukui, Suita-shi, Japan, assignors to Matsushita Electric Industrial Co., Ltd., Osaka, Japan Filed June 2, 1966, Ser. No. 554,775
Claims priority, application Japan, June 2, 1965, 40/33,263; June 17, 1965, 40/36,706, 40/36,709, 40/36,710
Int. Cl. H04b 1/26
U.S. Cl. 325—422 9 Claims

ABSTRACT OF THE DISCLOSURE

An autotuning radio receiver. The receiver has a radio receiving circuit, a sweep controlling circuit, a hold controlling circuit, a sweep voltage supplying circuit, a source of capacitor current, a charge controlling switch means and voltage variable capacitance diodes. The voltage variable capacitance diodes are used for autotuning, and during a period when a received signal is interrupted, a tuning of the frequency is held by stopping a voltage sweep at the voltage corresponding to the received frequency. Loss of the stored electric charge in a capacitor in said sweep voltage supplying circuit is compensated by means of said hold controlling circuit and said charge controlling switch means.

This invention relates to an electronic autotuning radio receiver provided with a frequency holding circuit which stops a sweep action and compensates for a loss in electrical energy of a charged capacitor during a period when a received signal becomes weak so as to hold the tuning frequency of the receiver equal to a received signal frequency for a long period of time.

Conventional autotuning radio receivers usually comprise a voltage variable capacitor in a local oscillator and high frequency tuning circuit, and they receive a signal by stopping a sweep action at a desired tuning frequency. Said voltage variable capacitor is biased by the output voltage of a sweep circuit which is operated by storing an electrical charge in a capacitor therein. Said sweep action is stopped by a partial amount of the output voltage of a received signal. Therefore, when a received signal becomes weak even for a short time due to fading or shadow loss, it cannot be avoided that said sweep action starts again. In the situation where there exist many possible signals in a frequency range which can be received by the receiver, there are many troubles in the practical operation of an autotuning radio receiver because a signal from an undesired station will be received.

It is an object of this invention to provide an autotuning radio receiver in which the sweep action of the sweep circuit stops in such a way that the bias voltages of the voltage variable capacitance diodes are kept at a definite value by using a switch for controlling the electrical charge in the capacitor even when a signal being received fades out.

It is further object of this invention to provide an autotuning radio receiver having a voltage sweep circuit which comprises a circuit or active element for compensating for a loss in electrical energy of the capacitor.

It is another object of this invention to provide an autotuning radio receiver in which the switch for charging the capacitor is a transistor having a switch in the base circuit thereof so that it acts as a switch to compensate for a loss in the electrical charge of the capacitor.

Other objects of this invention will be pointed out in the following description and claims and illustrated in the accompanying drawings which disclose, by way of example, the principle of the invention and the best mode which has been contemplated of applying that principle.

Figure 1:
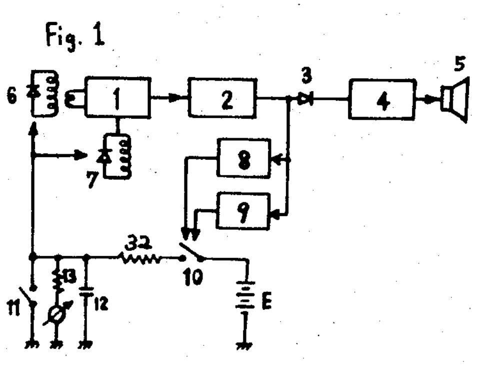
FIG. 1 is a circuit diagram illustrating an autotuning radio set with a hold controlling circuit.

Referring to FIG. 1, a converter circuit 1 has an intermediate frequency amplifier (IF amp.) 2 connected thereto. A detector 3 is connected to the IF amp. and an audio frequency amplifier 4 is connected to the detector, the output of which is fed to a speaker 5. A voltage variable capacitance diode 6 is provided in a high frequency tuning circuit, and a voltage variable capacitance 7 diode is provided in a local oscillator. A circuit 8 connected to the output side of the IF amp. opens a charge controlling switch 10 only when a received signal becomes weak for a short time due to the aforesaid reasons, and is therefore called, for convenience, a hold controlling circuit for holding an original voltage.

The output voltage for the sweep action is controlled by a sweep controlling circuit 9 also connected to the output side of the IF amp. 2. Reference character 10 designates a switch which can be a relay contact or a transistor switch, and which is connected between a source of energy E and a capacitor 12 for storing electrical energy through a resistance 32. A frequency indicating circuit or a voltage indicating circuit 13 is connected in parallel with the capacitor 12. Hereinafter whether the circuit is a frequency indicating circuit or a voltage indicating circuit, it will be designated as a frequency indicating circuit. When the output sweep voltage is a maximum, a grounding switch 11 is provided so as to reset it to zero.

When said switch 10 is closed, the voltage across the terminals of said charged capacitor 12 starts to increase and then a reverse bias voltage applied to said diodes 6 and 7 starts to increase. A variation in the capacity of said diodes 6 and 7 causes a sweep of the tuning frequencies as the bias voltage increases. When the tuning frequency matches that of a received signal during the sweep, an output from said intermediate frequency amplifier 2 will be generated. The generated output operates said controlling circuit 9, opens said switch 10 and prevents an increase in the charge on said capacitor 12. On the other hand, the voltage across the terminals of said capacitor 12 decreases gradually because of a loss of the stored charge due to the leakage current of said capacitor 12, said frequency indicating circuit 13 and diodes 6 and 7. The decrease in said voltage causes the tuning frequency to deviate from the signal frequency and successively decreases the output of IF amp. 2. This in turn results in the closing of said switch 10. Said capacitor 12 is again supplied with electrical energy due to the closing of said switch 10 and again has a high voltage across the terminals thereof. Again, the tuning frequency becomes equal to the signal frequency. In such a way, a predetermined signal is continuously received by an automatic operation of the opening and closing of said switch 10 so long as the received signal continues. The receiver thus produces an automatic frequency control effect.

According to this invention, the bias voltage of diodes 6 and 7 can be maintained during the time a received signal is being detected by employing said additional circuit 8 which opens said switch 10 so as to prevent said capacitor 12 from generating a sweep voltage even when the received signal fades out.

Figure 7:
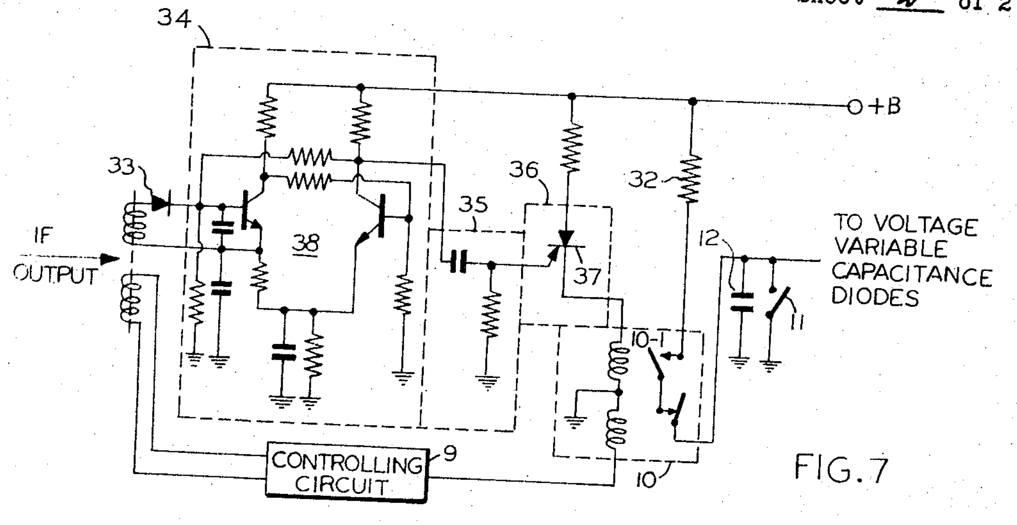
FIGS. 7, 8 and 9 are circuit diagrams illustrating a hold controlling circuit usable for said autotuning radio receiver.

Said function of control circuit 8 is effected by employing a differentiation circuit and a bistable circuit. An operable circuit is shown in FIG. 7 and comprises a rectifier 33 which rectifies a part of the received signal, an additional switch 34 such as a monostable circuit 38 triggered by the rectified signal, a differentiation circuit 35 having a means for differentiating a transition in a D.C. output voltage caused by an on-off operation of said additional switch 34, and a bistable circuit 36 having a means for reversing the condition thereof when a different polarity input pulse is received. In this circuit diagram, these component circuits are in a tandem connection and said bistable circuit 36 can be constituted by a gate controlled switch 37 which is called GCS for convenience and is a kind of thyristor. During a receiving period, said rectifier 33 generates the rectified signal and said monostable circuit 38 supplies a definite voltage of a certain polarity. When the signal is interrupted, said monostable circuit 38 rapidly attains a reference voltage corresponding to a zero output because of the disappearance of the triggered input. Said differentiation circuit 35 connected to said monostable circuit 38 generates a pulse of a plus or minus polarity depending upon the variation in the voltage. As an example of generating a pulse of a minus polarity, said differentiation circuit generates a pulse having a plus polarity when a no signal condition changes into a receiving condition. When a silicon pnpn type gate controlled switch is used as the bistable circuit, the switch is held in a nonconductive state by a pulse of a minus polarity until a pulse of a plus polarity is applied thereto. When a relay means is used as said switch 10, an exciting current does not enter the coil of relay 10–1 so as to open said switch 10.

Figure 8:
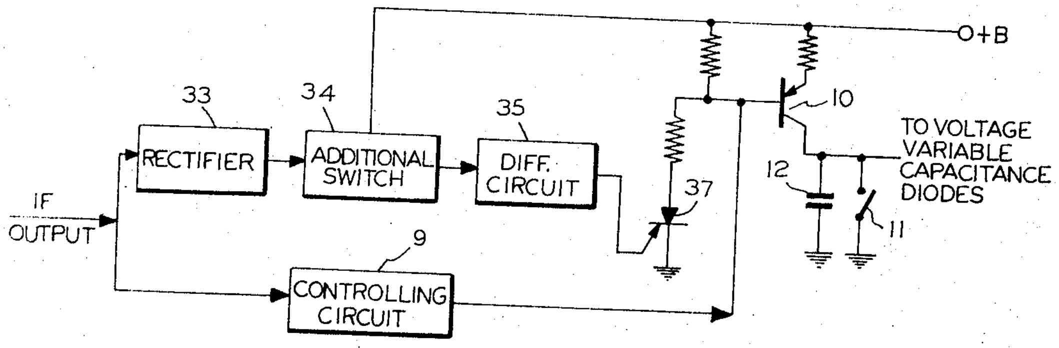

A switch which can be used as said switch 10 is a switch having a mechanical means such as a relay contact, as described above, or an electronic switch utilizing various kinds of active elements, for example as shown in FIG. 8. It is necessary to choose the switch depending on the polarity and magnitude of said pulse. The choice can be made easily by one skilled in the art.

Figure 9:
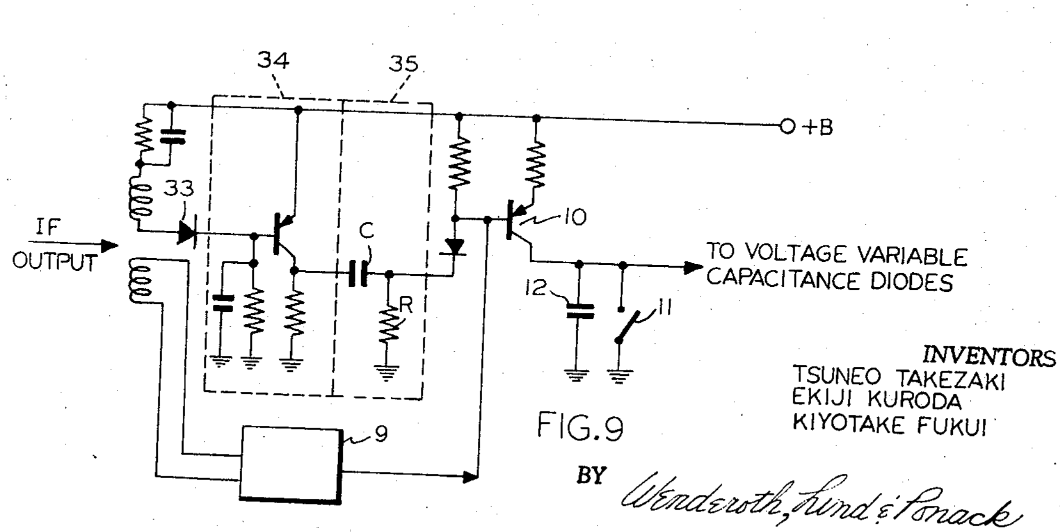

A large time constant caused by a large capacitor and large resistors in said differentiation circuit generates a long duration pulse for a transition from the receiving state. In FIG. 9, said switch 10 can be opened by the long duration pulse having a polarity which is determined by a transition from a signal receiving state into a no-signal state. When a signal does not fade in again after a definite period depending on the value of said time constant, said switch 10 closes automatically in such a way that the radio receiver starts to search for succeeding signals. This feature makes possible many uses of the radio since it can search automatically for succeeding signals when a signal disappears.

The opening of switch 10, however, results in a loss of electrical charge due to the leakage current of said capacitor 12, diodes 6 and 7 and frequency indicating circuit 13, and accordingly in a decrease in the voltage across terminals of said capacitor 12. Therefore, the tuning frequency of the receiver varies with said decrease. For example, when said capacitor 12 is a tantalum wet electrolytic capacitor which has 100 μf. of capacitance and which has the lowest leakage current among the available capacitors, and the two voltage variable capacitance silicon diodes are in hyper abrupt junction having about 100 mμa. of leakage current, the voltage across the terminals of the capacitor decreases at a rate greater than 3 mv./sec. In this case, the frequency indicating circuit 13 is omitted.

A similar function can be achieved by employing a circuit in which a diode is connected, in a forward direction with respect to a charging current, between said capacitor 12 and the resistor 32 in FIG. 1, and said switch 10 is connected in parallel with said diode and said capacitor 12. Said diode prevents the electric charge stored in said capacitor 12 from flowing away through said switch 10 when it is in a closed position. In this circuit, both said hold controlling circuit 8 and said sweep controlling circuit 9 close said switch 10 so that the charging current is by-passed through said switch 10 to stop a sweep voltage. The remainder of the receiving means and voltage holding means are the same as in the embodiment of the preceding descriptions, except for a closed position of said switch 10.

Figure 2:
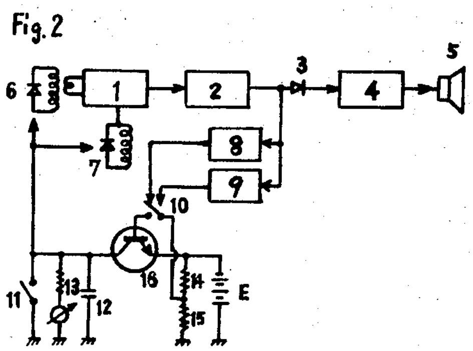
FIG. 2 is a circuit diagram illustrating an autotuning radio set with a hold controlling circuit and a transistor switch compensate for a loss in the electrical charge of the capacitor.

Referring to FIG. 2, reference characters 1 to 13 designate the same elements as in FIG. 1, and 14 and 15 are resistors for use in biasing a transistor base and a transistor switch 16 is connected between the source of energy E and capacitor 12 for controlling the charge in said capacitor 12 by a constant current. Switch 10 is in the base circuit of the transistor 12.

In the closed position of switch 10 a bias voltage is applied to the base of the transistor, the value of the current depending upon the charge current or the sweeping time, and closes said transistor switch 16 so as to store the electric charge in said capacitor 12. When the voltage across terminals of said capacitor 12 reaches a certain value, a received signal of a frequency the same as that reached by the tuned receiver generates in the IF amp. 2 an output voltage which opens said switch 10 by means of said controlling circuit 9. Consequently, said transistor 16 is in an open circuit condition and has a collector-emitter saturation current corresponding to the base-open condition, i.e. $I_{CEO}$ flowing through it. Said $I_{CEO}$ ranges from about 100 mμa. for a silicon transistor to several hundred μa. for a germanium transistor. An equilibrium state between the discharged and charged condition of the capacitor can be easily achieved by making said $I_{CEO}$ approximately equal to the sum of leakage currents of said capacitor 12, diodes 6 and 7 and frequency indicating circuit 13. It is possible to hold a voltage across terminals of capacitor 12 equal to the original voltage when a signal was received and to cause the tuned frequency to remain at the frequency of the received signal for a long time. Accordingly, a signal which fades in again operates said sweep controlling circuit 9 and stops said hold controlling circuit 8 so as to return to an ordinary receiving action.

It has been discovered according to the present invention that a negative feed back circuit makes it possible to compensate for a loss in the electrical energy of said capacitor 12 and to achieve an equilibrium state of said capacitor 12 during the time when a voltage is to be held, as described hereinafter.

Figure 3:
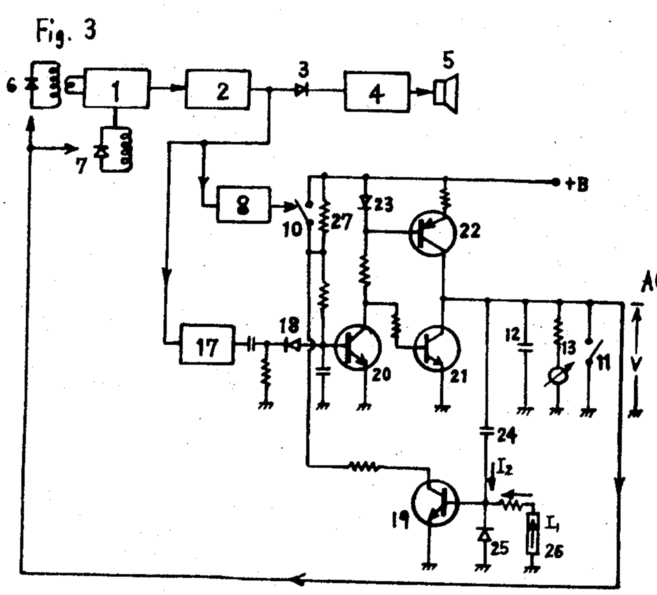
FIG. 3 is a circuit diagram illustrating an autotuning radio set with a hold controlling circuit and a negative feedback system for compensating for a loss in the electrical charge of the capacitor.

Referring to FIG. 3, reference characters 1 to 8 and 10–13 designate the same elements as in FIG. 1. In addition, the receiver includes a controlling IF amp. connected to the output side of the IF amp. 2, a diode detector 18 connected to the output side of controlling IF amp. 17, and a first switching transistor 20 to the base of which the diode 18 is connected. An amplifying transistor 19 is provided and has its collector connected to one side of switch 10, which in turn is in parallel with resistor 27. An amplifying transistor 21 has its base connected to the emiter of transistor 20. A charging transistor 22 for charging up capacitor 12 at a constant current is provided and has the collector connected to the collector for transistor 21 and the base connected to the collector of transistor 20. A diode 23 is connected to the base of transistor 22 and switch 10 for supplying a bias voltage to said transistor 22. An additional capacitor 24 is connected between the collectors of transistors 22 and 21 and the base of transistor 19 for feeding a variation in the output voltage back to the input side. A diode 25 is connected to the side of capacitor 24 which is toward the base of transistor 19 to permit flow of a discharging current for said capacitor 24 when the voltage across the terminals of said capacitor 12 is reset to zero by said switch 11. A source of current 26 supplies the necessary bias current to said transistor 19 through a resistance for holding a voltage.

Closing of switch 10 causes transistor 21 to be cutoff, and electrical energy is stored in said capacitors 12 and 24. At this time the sweeping rate is high because a resistor 27 is short circuited by the switch 10 and said transistor 19 is not coupled with said transistor 20. The output voltage, V, increases to $V_s$, which is high enough for receiving the signal. The received signal generates an output voltage in the IF amp. 17 which is rectified by said diode 18. The rectified output voltage of IF amp. 17 causes said transistor 20 to open the circuit through its collector and emitter and simultaneously to cause said transistor 21 to transmit through its collector and emitter. This drains electrical charge from said capacitors 12 and 24. Thereafter, the bias voltage on diodes 6 and 7 can be held by the AFC effect by the closing and opening of said transistor 21 as illustrated in the preceding description. When a signal is interrupted or fades out, the controlling circuit 8 is actuated and said switch 10 opens. Then the collector current of said transistor 19, as biased by the source of current 26 through a high resistance, flows through said resistor 27 so as to couple said transistor 19 with said transistor 20 through said resistor 27. This coupling forms a feedback loop among said transistors 19, 20 and 21 and said capacitor 24, and stops the sweep action due to a voltage drop across said resistor 27.

However, as the signal fades out at said diode rectifier 18, the output voltage V of said capacitor 24 is apt to vary and cause an interruption of its operations. Said capacitor 24 generates a current in proportion to the variation i.e.

$$I=C_2\frac{dv}{dt}$$

where $C_2$ is a capacitance of said capacitor 24. The generated current flows through the base circuit of said transistor 19 so as to change the collector current. The variation in the collector current of transistor 19 is amplified by said transistor 20 and actuates said transistor 21 in such a way that the variation in the voltage V is cancelled and is lowered.

Figure 4:
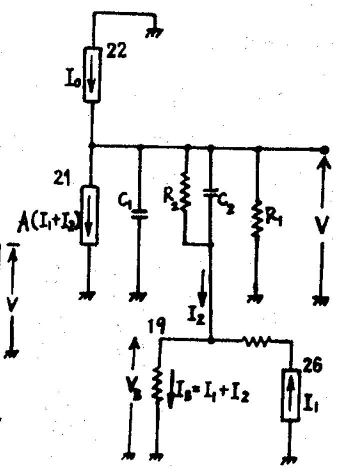
FIG. 4 is an equivalent circuit diagram illustrating the function of said negative feedback system of FIG. 3.

The voltage holding action will be illustrated by reference to an equivalent circuit shown in FIG. 4.

The base current $I_B$ of said transistor 19 and the collector current $I_0$ of said transistor 22 are expressed by the following equations, respectively:

$$I_B=I_1+I_2=I_1+C_2\frac{d(v-v_B)}{dt}+\frac{v-v_B}{R_2} \qquad (1)$$

$$I_0=C_1\frac{dv}{dt}+C_2\frac{d(v-v_B)}{dt}+AI_B+\frac{v}{R_1}+\frac{v-v_B}{R_2} \qquad (2)$$

wherein $C_1$=the capacitance of said capacitor 12
$C_2$=the capacitance of said capacitor 24
$R_1$=an equivalent load resistance
$R_2$=an equivalent leakage resistance of said capacitor 24
$I_1$=an electric current flowing from said current source 26
$I_2$=the sum of the leakage current and charging or discharging current of said capacitor $C_2$
$v_B$=the voltage difference between the case and emitter of said transistor 19
A=the current gain of the amplifier comprising said transistors 19, 20 and 21

These equations can be solved to give an equation:

$$V=V_S+\frac{1}{C_1+AC_2}\left\{I_0-A\left(\frac{V_S}{R_2}+I_1\right)\right\}t \qquad (3)$$

where $A\gg1$ and $V=V_s$ for $t=0$

Accordingly, the following equation expresses the variation $\Delta V$ in the output voltage V at a time $\Delta t$;

$$\Delta V=\frac{1}{C_1+AC_2}\left\{I_0-A\left(\frac{V_S}{R_2}+I_1\right)\right\}\Delta t \qquad (4)$$

For the voltage V to remain constant, it is necessary that $$\Delta V=0$$

Hence, $$I_1=\frac{I_0}{A}-\frac{V_S}{R_2} \qquad (5)$$

The term, $$I_0-A\left(\frac{V_S}{R_2}+I_1\right)$$

designates the charging current for said capacitors 12 and 24.

As a practical matter, it is difficult to make $I_0$ absolutely constant and the term $V_s/R_2$ also varies as $V_s$ varies. These situations usually prevent the Equation 5 from holding true regardless of $V_s$. On the other hand, the A which is the current gain of amplifiers 19, 20 and 21 easily exceeds several thousands so that the denominator of Equation 4 becomes very large. Equation 4 indicates that as the unbalance between the charging and discharging currents charges up a large capacitance $AC_2$, the variation in the voltage becomes extremely minor.

Since the term $V_s/R_2$ expresses the leakage current of said feedback capacitor $C_2$ which corresponds to said capacitor 24 in FIG. 3, the Equation 5 is modified as follows when a capacitor having very small leakage current is used:

$$I_1=I_0/A \qquad (6)$$

Figure 5:
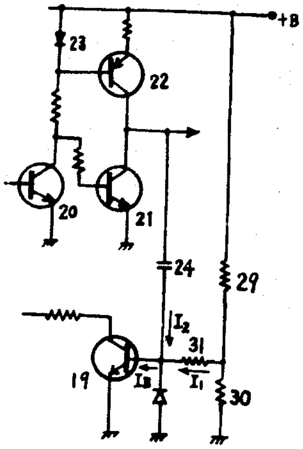
FIGS. 5 and 6 are circuit diagrams illustrating a method of base biasing a transistor of said negative feedback system.

This equation suggests that the output voltage is more easily held equal to the original voltage when a signal is received. In this case the current source 26 for said transistor 19 can be modified into a simple circuit in which the output voltage of a voltage divider comprising resistors 29 and 30 is applied to the base of transistor 19 through a resistor 31 having a large resistance. This modification is illustrated in FIG. 5.

Figure 6:
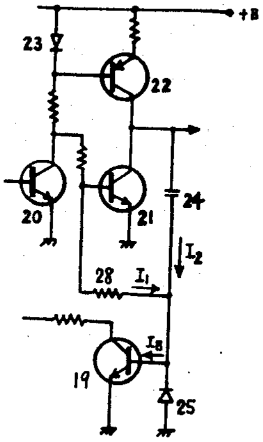

The circuit diagram of FIG. 6 shows a circuit in which $I_1$ varies with $I_0$ and $V_s$ of the Equation 5 in accordance with this invention. The collector current of transistor 21 is equal to the difference between the $I_0$ and a leakage current flowing through capacitors and load resistances regardless of $V_s$. There exists in the circuit a base bias voltage necessary for causing the collector current to flow. The base bias voltage of said transistor 21 is a definite value depending upon $V_s$ and decreases with an increase in $V_s$.

When the base bias current $I_1$ of said transistor 19 flows through a resistor 28 having a high resistance from the base of said transistor 21 as shown in FIG. 6, at an arbitrary output voltage, there exists a current approximately equal to $I_1$ as shown by the necessary conditions of Equation 5. In addition, it is preferable in order to compensate for temperature variation in various transistor parameters to supply the base bias current of said transistor 19 through said resistor 28.

A specified embodiment of this invention, as exemplified in FIG. 2, is set forth in the following example. The elements have the following specified values:

Capacitor 12=tantalum electrolytic capacitor having 80 μf. of capacitance and 80 mμa. of leakage current at 10 v.
Sum of the reverse current of voltage variable capacitance diodes 6 and 7=160 mμa. at 10 v.
Transistor 16=silicon planer transistor 2SC183

In this example the capacitors have a lower capacitance, but the circuit can achieve a holding time twice as long as long of the example of FIG. 1 as shown in table.

TABLE

| Output voltage (v.) | Variation in voltage | |
|---|---|---|
| | (Mv./sec.) | (Percent/sec. |
| 9.6 | −1.4 | $-1.46\times10^{-}$ |
| 5.4 | −0.19 | $-1.88\times10^{-}$ |
| 1.1 | −0.15 | $-1.36\times10^{-}$ |

In connection with FIG. 6, the circuit elements can have the following specified values and connections:

Capacitor 24=tantalum electrolytic capacitor with 100 $\mu$f. capacitance and 80 m$\mu$a. of leakage current at 10 v.
Capacitor 12 (FIG. 3)=aluminum electrolytic capacitor with 10 $\mu$f. capacitance
Variable capacitance diodes 6 and 7=the same as those of preceding example
Frequency (voltage) indicating circuit is always connected to a circuit
Current gain A=about 1000
Transistor 22=germanium transistor alloy type 2SB172
Transistors 19, 20 and 21=silicon planer transistor 2SC183

These specific embodiments can operate so as to produce no variation in the output voltage at room temperature and +0.2 mv./sec. variation at 40° C.

The circuit diagram of FIG. 5 has the same circuit elements as those of the preceding example and said resistor 30 is adjusted in such a way that there exists no variation in the voltage at 5 v. of output voltage. This specific device according to the present invention can achieve 0.3 mv./sec. variation at 1 and 10 v. of output voltage.

From these examples and the above description it will be readily understood that the devices according to this invention can be used not only as an autotuning radio receiver but also as an analog voltage holding circuit having a variation lower by an amount of $10^2$ than that of conventional devices. A further feature of this device according to this invention is that the circuit for an autotuning portable radio receiver set can be made very simple.

What is claimed is:

1. An autotuning radio receiver comprising a radio receiving circuit, a sweep controlling circuit connected to the output of said receiving circuit, a hold controlling circuit connected in parallel with said sweep controlling circuit, a sweep voltage supplying circuit having a sweep voltage supply means including a capacitor therein which can be charged and discharged, a source of capacitor current, a charge controlling switch means which is connected in series between said capacitor and said source of current, and voltage variable capacitance diodes in the tuning circuits of said receiving circuits and coupled to said capacitor and reversely biased by the sweep voltage, said sweep controlling circuit being actuated by a portion of the energy of an amplified received signal for opening said switch means and stopping said sweep voltage to stop the sweep action and cause said radio receiving circuit to receive a signal, said hold controlling circuit holding said switch means open for stopping said sweep voltage during a period when the received signal is interrupted, the capacitor maintaining the bias voltage of said voltage variable capacitance diodes whereby detuning of the receiver from the received signal frequency is prevented.

2. An autotuning radio receiver as claimed in claim 1 wherein said hold controlling circuit comprises a rectifier which rectifies the portion of the amplified received signal, an additional switch circuit coupled to the rectifier and triggered by the rectified signal, a differentiation circuit coupled to said switch circuit which transforms the DC output voltage into a pulse of a different polarity with the on-off operation of said additional switch circuit, and a bistable circuit coupled to said differentiation circuit and having means transforming a receiving state into a holding state depending upon the polarity of the incoming pulse.

3. An autotuning radio receiver as claimed in claim 1 wherein said hold controlling circuit comprises a rectifier which rectifies the portion of the amplified received signal, an additional switch circuit coupled to the rectifier and triggered by the rectified signal, a differentiation circuit coupled to said switch circuit for effecting a large time constant and a DC output voltage is transformed into a pulse of a different polarity with the on-off operation of said additional switch circuit, and means for opening said charge controlling switch for a definite period of the long duration pulse generating during a transition from a receiving state to a no signal state.

4. An autotuning radio receiver as claimed in claim 1 in which said switch means comprises a compensation means which supplies electric energy to said capacitor to compensate for a loss in the electric energy in said capacitor during a voltage holding period.

5. An autotuning radio receiver as claimed in claim 2 wherein said charge controlling switch means is a transistor having the emitter-collector connected between said capacitor and said source of current and having a switch in its base circuit, and said hold controlling circuit and said sweep control circuit actuate said base circuit switch, and said loss in electric energy of said capacitor being compensated by the current flowing between the emitter and collector of said transistor during the time said base circuit is open.

6. An autotuning radio receiver as claimed in claim 3 wherein said charge controlling switch means is a transistor having the emitter-collector connected between said capacitor and said source of current and having a switch in its base circuit, and said hold controlling circuit and said sweep control circuit actuate said base circuit switch, and said loss in electric energy of said capacitor being compensated by the current flowing between the emitter and collector of said transistor during the time said base circuit is open.

7. An autotuning radio received as claimed in claim 1 in which said switch means comprises a first switching circuit which is connected in parallel with said capacitor and consists of an even number of transistors and having a switch transistor the base circuit of which is energized by said sweep controlling circuit, an input circuit coupled to the base of said switch transistor and having a resistor therein, a second switch connected in parallel with said resistor, an amplifier transistor having the collector thereof connected to said second switch by a common emitter connection, a bias current source to which the base of said amplifier transistor is connected, a high resistance in said base circuit, an additional capacitor having one terminal connected to the hot-side of said voltage sweep circuit and the other terminal connected to the base of said amplifying transistor, said second switch being opened by said hold controlling circuit only during a period of disappearance of the received signal so as to open said first switch and to stop a sweep and simultaneously establish a feedback loop through one of said transistors in said first switching circuit and through said resistor, said additional capacitor supplying a current proportional to a variation in a sweep voltage produced during the interrupted period is amplified by said transistor and fed back to the input side of said first switching circuit so as to compensate for a loss in electric energy of said capacitor of said voltage sweep circuit and to hold a bias voltage on said voltage variable capacitance diodes.

8. An autotuning radio receiver as claimed in claim 7 wherein said bias current source for said amplifier transistor is the base bias voltage of the final stage of said first switching circuit.

9. An autotuning radio receiver comprising a radio receiving circuit, a sweep controlling circuit connected to the output of said receiving circuit, a hold controlling circuit connected in parallel with said sweep controlling circuit, a voltage sweep circuit having a sweep means in the form of a chargeable and dischargeable capacitor therein, a source of capacitor current coupled to said voltage sweep circuit, a charge controlling switch connected in parallel with said capacitor and controlling the storage of electric energy in said capacitor, and voltage variable capacitance diodes in the tuning circuits of said receiving circuit and coupled with said capacitor and reversely biased by a sweep voltage, said sweep controlling circuit being actuated by a portion of the energy of an amplified received signal for closing said switch and stopping said sweep voltage to stop the sweep action and cause said radio receiving circuit to receive a signal, said hold controlling circuit holding said switch closed for stopping said sweep voltage during a period when the received signal is interrupted, said capacitor maintaining the bias voltage of said voltage variable capacitance diodes whereby detuning of the receiver from the received signal frequency is prevented.

References Cited

UNITED STATES PATENTS 2,977,467 3/1961 Black ---------- 325—457 XR

KATHLEEN H. CLAFFY, *Primary Examiner.*

B. P. SMITH, *Assistant Examiner.*

U.S. Cl. X.R.

325—453, 457; 331—36